United States Patent [19]
Koiwa et al.

[11] Patent Number: 5,882,065
[45] Date of Patent: Mar. 16, 1999

[54] FRONT BODY STRUCTURE OF AUTOMOBILE

[75] Inventors: Takeshi Koiwa; Hideaki Takaishi, both of Saitama-ken, Japan

[73] Assignee: Honda Giken Kogyo Kabushiki Kaisha, Tokyo, Japan

[21] Appl. No.: 966,752

[22] Filed: Nov. 10, 1997

Related U.S. Application Data

[63] Continuation of Ser. No. 582,081, Oct. 18, 1995, abandoned.

[30] Foreign Application Priority Data

Oct. 19, 1994 [JP] Japan ................................ 6-253680

[51] Int. Cl.$^6$ ................................................ B62D 25/08
[52] U.S. Cl. ...................... 296/203.02; 296/30; 296/188
[58] Field of Search .............................. 296/29, 30, 188, 296/189, 204, 194, 186, 203.02

[56] References Cited

U.S. PATENT DOCUMENTS

| | | | |
|---|---|---|---|
| 3,321,235 | 5/1967 | Muller et al. ........................... | 296/204 |
| 4,469,368 | 9/1984 | Eger ......................................... | 296/188 |
| 5,125,715 | 6/1992 | Kijima ..................................... | 296/189 |
| 5,562,329 | 10/1996 | Srock et al. ............................ | 296/203 |
| 5,713,625 | 2/1998 | Takahashi et al. ...................... | 296/194 |

FOREIGN PATENT DOCUMENTS

| | | | |
|---|---|---|---|
| 2128281 | 5/1981 | Germany ................................ | 296/29 |
| 254476 | 10/1989 | Japan ...................................... | 296/204 |
| 116479 | 10/1925 | Switzerland ............................ | 296/29 |
| 193090 | 2/1923 | United Kingdom .................... | 296/29 |

*Primary Examiner*—Dennis H. Pedder
*Attorney, Agent, or Firm*—Armstrong, Westerman, Hattori, McLeland & Naughton

[57] ABSTRACT

An automobile front body structure which having a cranked front side frame disposed at a lower portion of a front body of an automobile and having an L-shaped portion, a dashboard lower with a lower part placed upon the L-shaped portion, and a gusset connected to the L-shaped portion of the front side frame by means of the lower part of the dashboard lower. By the reinforcing action of the gusset, the rear end of the front side frame is retained firmly, whereby the structure is strengthened against an external force applied thereto and undesired local deformation of the dashboard lower may be suppressed.

7 Claims, 5 Drawing Sheets

FRONT BODY STRUCTURE OF AUTOMOBILE

This application is a continuation of application Ser. No. 08/582,081 filed Oct. 18. 1995, now abandoned.

BACKGROUND OF THE INVENTION

1. Field of the Invention

The present invention relates to an improvement in an automobile front body structure.

2. Description of the Related Art

Shown schematically in FIG. 6 of the accompanying drawings is a conventional front body structure of an automobile. As shown in the figure, the structure includes a cranked front side frame 101 extending longitudinally of the automobile, with which a lower end of a dashboard lower 102 is adjoined, and upon which a floor plate 103 is placed. On the floor plate 103, a front seat 104 is installed. A subframe 106 is provided at a corner formed by the front side frame 101 and the dashboard lower 102.

A structure is known which is designed to release, through the subframe 106 into the dashboard lower 102, part of an external force applied to the automobile frontwise as indicated by an arrow 1 in circle.

FIG. 7 schematically shows, in top plan, only the main part of the structure of FIG. 6. The subframes 106, which have, for example, trapezoidal configurations as seen from above, are constructed such that local deformation of the dashboard lower 102 may be suppressed by dispersing applied forces as indicated by arrows 2 and 3 in circle.

However, as shown in FIG. 6, the front side frames 101, cranked as viewed from sideways, are bent downwardly at the lower end of the dashboard lower 102, thus exhibiting poor rigidity against external forces as indicated by arrow 1 in circle. In other words, since the front side frames 101 are not supported at their rear surfaces directly by the dashboard lower 102, efficiency of support by the dashboard lower 102 is low.

The present invention has been achieved to solve the above-described problem inherent to the conventional automobile front body structure.

The present inventor conducted a careful study to rationally unify requirements for increased rigidity and effective shock absorption by properly enhancing the rigidity of the joints between the front side frames and the dashboard lower and by rendering the joints deformable moderately so that a shock due to an external force is effectively absorbed.

As a result, the inventor found that the foregoing problem is overcome by providing a gusset between the front side frames and the dashboard lower, thus leading to the present invention. The inventor also found that the problem is overcome by taking the constitution, shape, and thickness of the gusset into account.

It is therefore an object of the present invention to provide an automobile front body structure which is adapted to rationally unify requirements for increased rigidity and effective shock absorption by properly enhancing the rigidity of the joints between front side frames and a dashboard lower and by rendering the joints deformable moderately so that a shock due to an external force is effectively absorbed.

It is another object of the present invention to provide an automobile front body structure which has desired rigidity and undergoes desired deformation under the action of an external force, that is, which produces a good shock absorbing effect.

SUMMARY OF THE INVENTION

According to one aspect of the present invention, there is provided an automobile front body structure in which a lower part of a dashboard lower is laid over an L-shaped portion of a front side frame, disposed at a lower position of the front body structure and cranked as viewed sideways, through which lower part of the dashboard lower a gusset is secured to an L-shaped portion of the side frame. The gusset is comprised of a sloped plate facing rearwardly of the automobile, and side plates extending downwardly from both sides of the sloped plate. The sloped plate is bowed obliquely downwardly toward the front of the automobile body. The gusset is preferably formed of a plate thinner than the front side frame.

By the reinforcing effect of the gusset, the rear end of the front side frame is retained firmly, whereby the structure is strengthened against an external force applied thereto from the front and such inconveniences as undesired local deformation of the dashboard lower is suppressed. The gusset has also increased rigidity in that it is formed by the sloped plate and side plates. Since the sloped plate is bowed obliquely forwardly downwardly of the automobile, the gusset is weakened to such extent that it deforms to absorb a shock energy of an external force applied thereto from the front of the automobile. Further, by virtue of the sloped plate being bowed, a deformation mode may be controlled easily.

Since the gusset is formed of a thinner plate than the front side frame, the gusset is moderately reduced in rigidity so that it deforms to absorb a shock when an external force is applied thereto in a front-to-rear direction.

DETAILED DESCRIPTION

A preferred embodiment of the present invention will now be described, by way of example only, with reference to the accompanying drawings.

Figure 1:
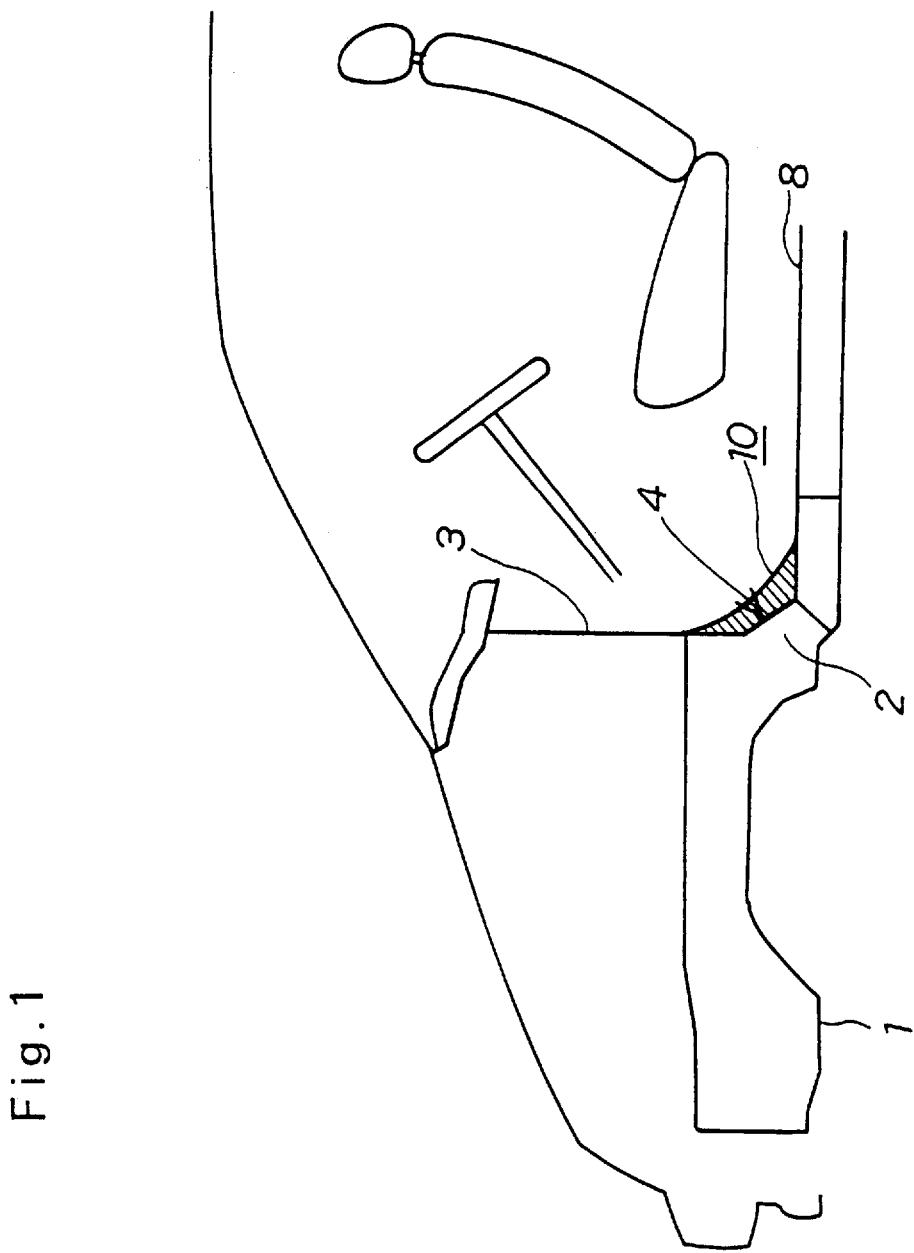
FIG. 1 is a schematic side view of an automobile front body structure according to the present invention.

FIG. 1 is a schematic side view of an automobile front body structure according to the present invention. As shown, the structure includes a front side frame 1 (hereinafter "side frame"), which is cranked as viewed sideways and has a substantially L-shaped portion 2 over which a lower part 4, proximate to a side of an automobile, of a substantially L-shaped lower part of a dashboard lower 3 is laid. A gusset 10 is secured, through the lower portion 4 of the dashboard lower, to the L-shaped portion 2 of the side frame 1.

Figure 2:
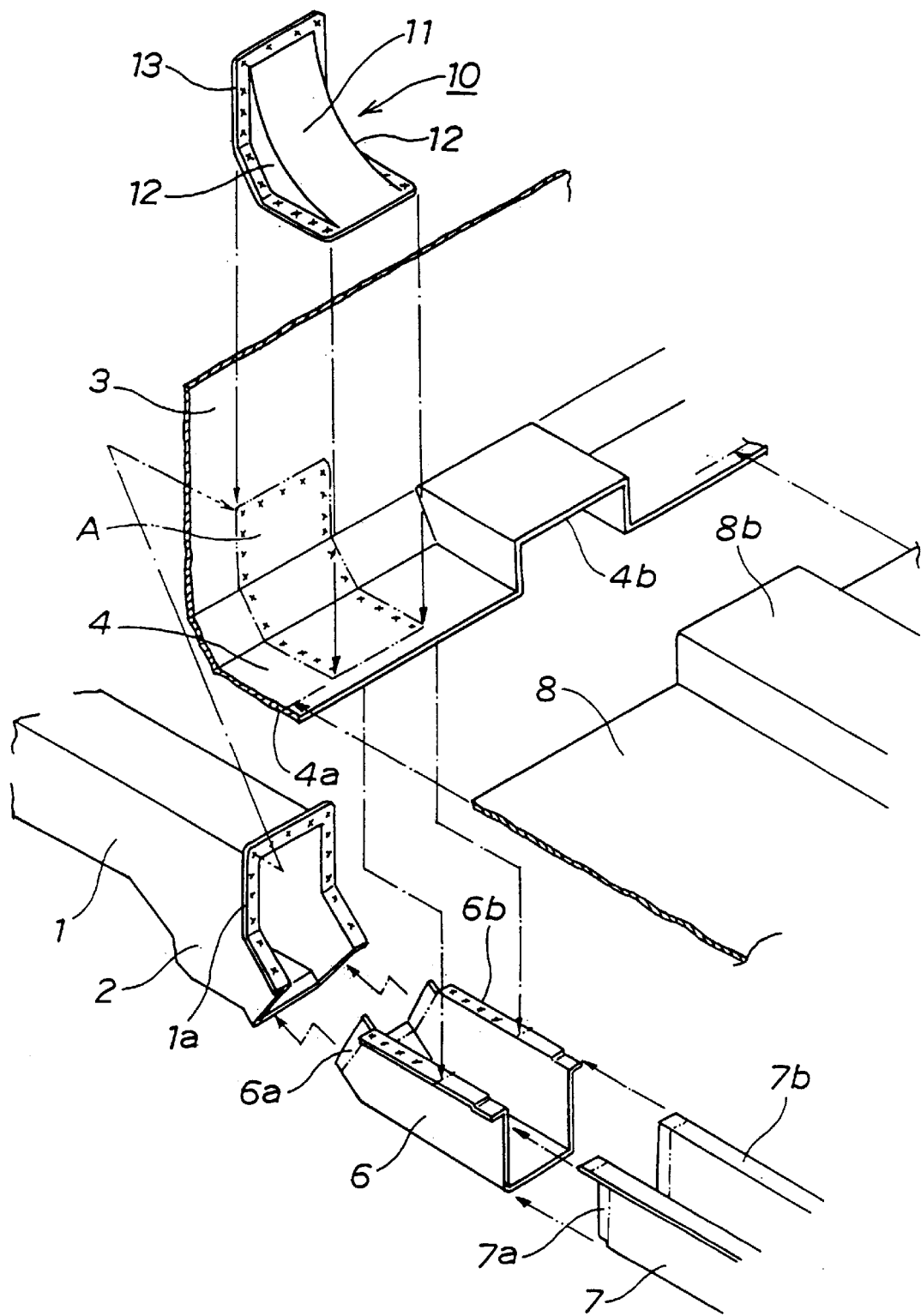
FIG. 2 is an exploded, partially cutaway, perspective view of the automobile front body structure according to the present invention.

FIG. 2 is an exploded perspective view of the automobile front body structure according to the present invention. The gusset 10 is what is defined as a "member to be placed at an angled connection between two separate members to reinforce the connection, a typical example being a corner plate". In the embodiment, the gusset is comprised of a sloped plate 11, side plates 12 extending from both sides of the sloped plate, and a flange 13 extending outwardly from the sides of the side plates 12 and upwardly from the top end of the sloped plate 11. The sloped plate 11 is bowed obliquely downwardly toward the front of the automobile.

The side frame 1 is configured to have a substantially rectangular cross section and has a flange 1a extending along an upper half of the rear end surface of the L-shaped portion 2. A front end 6a of a side frame rearward extension 6, which is opened upwardly and thus has a channel-shaped cross section, is connected endwise to the rear end of the L-shaped portion 2. A front end 7a of a floor frame 7, which is opened upwardly and thus has a channel-shaped cross section, is connected endwise to a rear end 6c of the side frame rearward extension 6. The side frame rearward extension 6 and floor frame 7 has flanges 6b and 7b formed integrally at their upper end surfaces.

It should be noted that, as can be seen from FIG. 2, each of the front side frame 1, the side frame rearward extension 6, and the floor frame 7, have a longitudinal axis such that the longitudinal axis of the front side frame 1, the longitudinal axis of the side frame rearward extension 6, and the longitudinal axis of the floor frame 7 are all contained in the same vertical plane and are not offset from each other in the widthwise direction of the automobile.

The dashboard lower 3 takes the form of a plate for forming a lower part of the dashboard lower potion 4, which plate is bent into an L shape, as described above. A floor plate 8 is laid over a rear end 4a. Tunnels 4b and 8b are formed centrally of the lower portion 4 of the dashboard lower 3 and the floor plate 8, respectively, to extend transversely of the automobile body.

The gusset 10 is weld connected to an area, indicated by an imaginary line A, at the substantially L-shaped portion running from a lower part of the dashboard lower 3 to the lower portion 4 thereof, which is above the L-shaped portion 2 of the side frame 1 and above the rearward extension 6.

Figure 3:
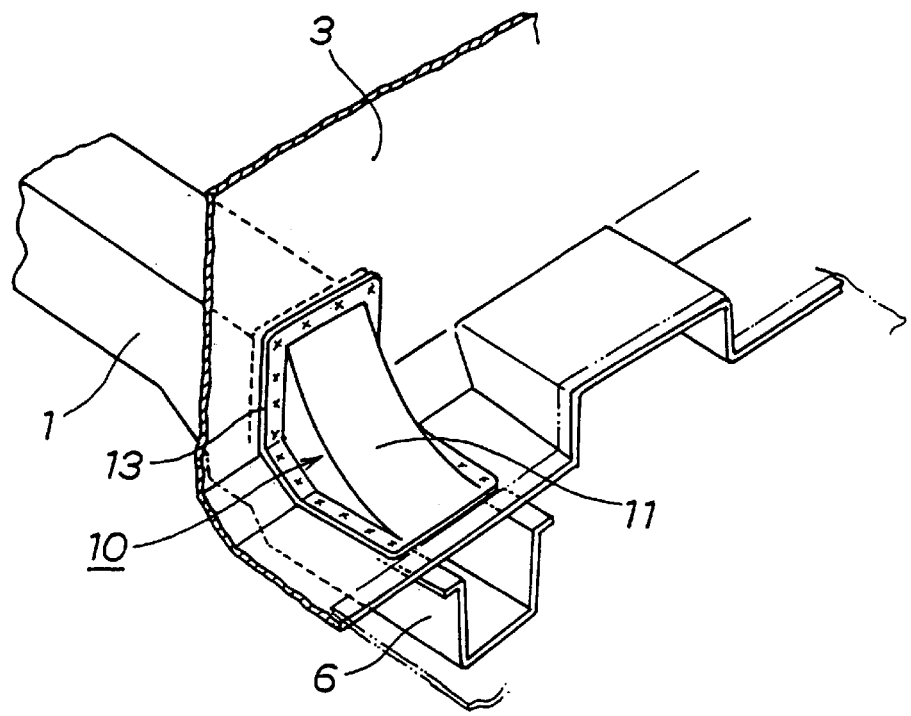
FIG. 3 is a partially cutaway perspective of the main part of the automobile front body structure.

FIG. 3 is a perspective view of the automobile front body structure according to the present invention, illustrating the components of FIG. 2 as assembled. Portions marked by "x" on the flange 13 of the gusset are weld connections, as also shown in FIG. 2.

Figure 4:
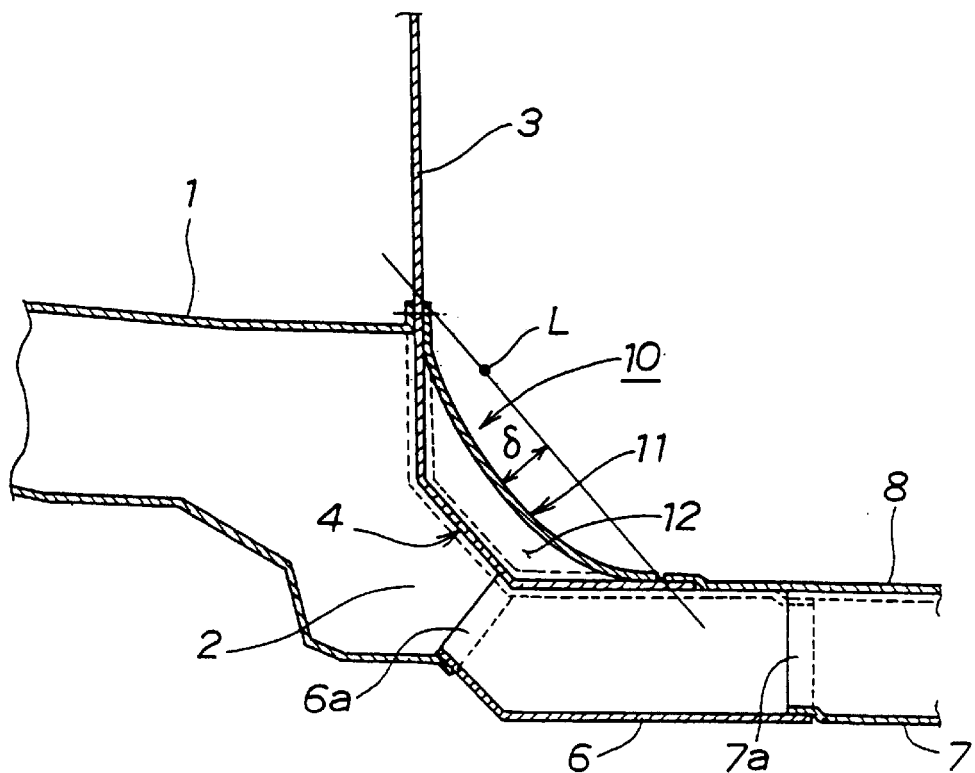
FIG. 4 is a cross-sectional view taken vertically of the main part of the automobile front body structure.

FIG. 4 is a vertically-sectioned side view of the main portion of the front body structure according to the present invention, wherein the L-shaped portion 2 formed by the side frame 1 and the side frame rearward extension 6 are first overlaid with the lower portion 4 of the dashboard lower 3 and with the gusset 10. Then, the L-shaped portion, the rearward extension, and the dashboard lower 3 are connected together by spot welding. The spot welding is done at a time after the three components are placed one over the other, thus reducing the number of welding steps. The sloped plate 11 of the gusset 10 is bowed or bent obliquely forwardly downwardly by the distance δ from a reference line L running between upper and lower ends of the sloped plate 11.

Figure 5A:
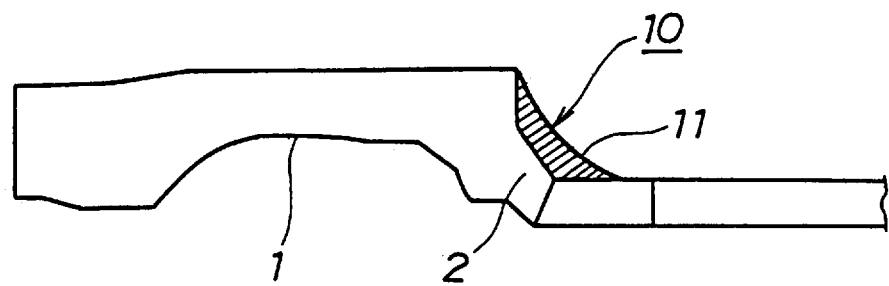
FIG. 5A is a schematic side view illustrating operation of the automobile front body structure as no external force is applied thereto.

Operation of the above-described front body structure will now be described with reference to FIGS. 5A and 5B, which respectively show schematically the front body structure in a normal state and the same structure as an extremely strong external force is applied thereto, as shown by arrow 3 in circle.

Figure 5B:
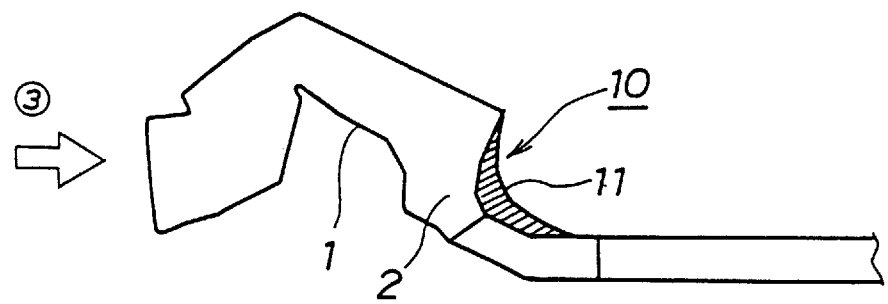
FIG. 5B is a schematic side view illustrating operation of the front body structure as an external force is applied thereto.
Figure 6:
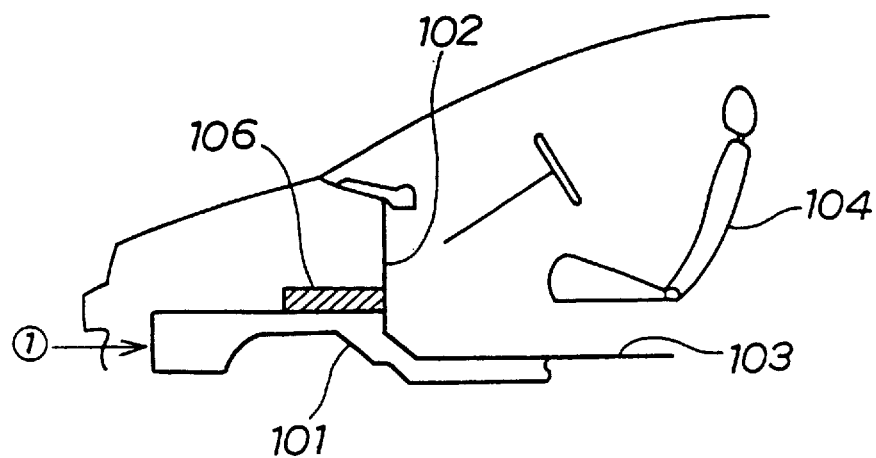
FIG. 6 is a schematic side view of a conventional automobile front body structure.
Figure 7:
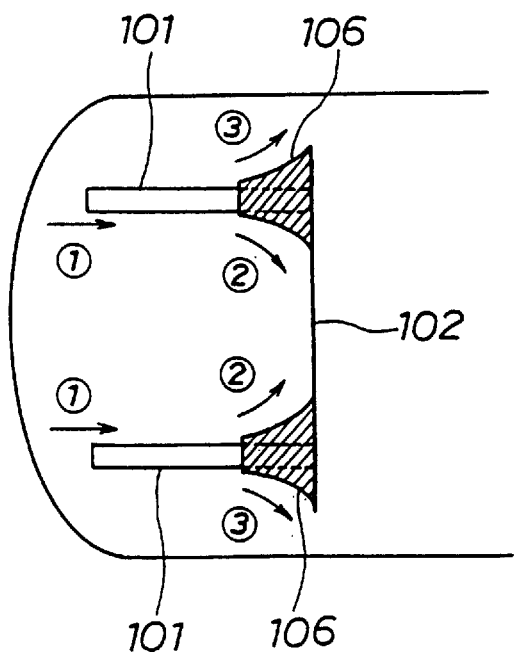
FIG. 7 is a schematic top plan view of the main part of the conventional automobile front body structure.

As shown in FIG. 5B, the side frame 1 is deformed to absorb a shock. At this time, since the gusset 10 reinforces and supports the L-shaped portion 2, local deformation is unlikely to occur on the dashboard lower (not shown in FIGS. 5A and 5B). Further, since the sloped plate 11 deforms into a horizontally-turned V shape, excellent shock absorbing action may be achieved with the gusset 10.

Stated otherwise, adoption of the gusset 10 in the form of the bowed, sloped plate 11 enables production of rigidity which minimizes excess local deformation likely to occur at the dashboard, as well as the required level of deformation for dampening or absorbing a shock.

The gusset 10 has a downwardly opened, channel-shaped cross section formed by the sloped plate 11 and right and left side plates 12, 12, thus producing relatively high flexural rigidity. Shock absorption operation may be further enhanced by employing a thinner plate as the gusset 10 than the side frame 1 to decrease the rigidity to some extent to thereby increase deformability of the gusset.

Being bowed as described above, the sloped plate 11 of the gusset 10 enables easy control of a deformation mode as an external force is applied to the automobile.

Since the gusset of the invention makes it possible to keep the amount of offset between the side frame and floor frame to a minimum, the rate of protrusion of the gusset into the inside of the automobile may be decreased, whereby an adequate level of rigidity and deformability may be provided to the frames without adversely affecting the quality of the commodity.

The arrangement of the present invention as thus far explained achieves the advantageous results as explained below.

Since the lower part of the dashboard lower is laid upon the L-shaped portion of the cranked front side frame and the gusset is attached to the L-shaped portion of the front side frame through the lower part of the dashboard lower, the rear end of the front side frame is retained by the reinforcing action of the gusset, whereby the front body structure may be strengthened against an external force applied thereto from the front. It also becomes possible to suppress such inconveniences that the dashboard lower is deformed locally by the external force.

Increased rigidity is provided to the gusset in that it is comprised of the sloped plate facing rearwardly of the automobile, and side plates extending downwardly from the sides of the sloped plate. Further, since it is comprised of a sloped plate bowed obliquely downwardly toward the front of the automobile, the gusset has reduced strength which allows its deformation when an external force is applied thereto, whereby effective shock energy absorption is enabled. The gusset being bowed also makes it possible to easily control its mode of deformation as an external force is applied thereto.

Being comprised of a thinner plate than the front side frame, the gusset has further reduced rigidity, whereby it is rendered capable of deforming to absorb a shock energy resulting from an external force applied frontwise thereto.

The front side frame, dashboard lower, and gusset are connected together by one time spot welding, whereby the number of weld operations is reduced.

What is claimed is:
1. A front body structure of an automobile, comprising:
a cranked front side frame disposed at a lower end portion of a front body of said automobile, wherein said front side frame has a front end, a substantially L-shaped portion at a rear end thereof, and a central longitudinal axis;

a dashboard lower with a lower part placed up on said L-shaped portion of said front side frame, said dashboard lower having an arched cross section including substantially vertical and horizontal walls and a lower portion connecting said walls and extending rearwardly of the vertical wall;

a gusset connected to said L-shaped portion of said front side frame land said lower part of said dashboard lower; and a side frame rearward extension having a front end, a rear end and a central longitudinal axis and a floor frame having a front end, a rear end and a central longitudinal axis, wherein said rear end of said front side frame is connected to said front end of said side frame rearward extension in an end to end manner so that said central longitudinal axis of said front side frame and said central longitudinal axis of said side frame rearward extension are contained in a vertical plane, and said rear end of said side frame rearward extension is connected to said front end of said floor frame in an end to end manner so that said central longitudinal axis of said side frame rearward extension and said central longitudinal axis of said floor frame are contained in said vertical plane; and wherein said gusset is comprised of a sloped plate and a pair of right and left side plates extending downwardly towards a floor plate of said automobile from both sides of said sloped plate, said sloped plate having an upper surface downwardly arched from a line joining upper and lower ends thereof, and which is attached to said substantially vertical and horizontal walls and to said lower portion at said side plates.

2. The front body structure according to claim 1, wherein said lower part of said dashboard lower is disposed on said substantially L-shaped portion of said front side frame, and said gusset is disposed on said substantially L-shaped portion of said front side frame.

3. The front body structure according to claim 1, wherein said sloped plate of said gusset is bowed obliquely forwardly and downwardly of said automobile.

4. The front body structure according to claim 1, wherein said gussets, formed by said sloped plate, has a thickness less than a thickness of said front side frame.

5. The front body structure according to any one of claims 3 and 4, wherein said gusset includes flanges disposed at least on ends of said right and left plates for allowing weld connection of said gusset.

6. The front body structure according to claim 1, wherein said front side frame, said dashboard lower and said gusset are weld connected together by a single spot welding operation.

7. The front body structure according to claim 1, wherein said front side frame has a substantially rectangular cross section, said side frame rearward extension and said floor frame are substantially channel-shaped so that a bottom of said side frame rearward extension and said floor frame face a ceiling of said automobile.

* * * * *